United States Patent
Lee et al.

(10) Patent No.: US 12,059,882 B2
(45) Date of Patent: Aug. 13, 2024

(54) DASH ISOLATION PAD

(71) Applicants: Hyundai Motor Company, Seoul (KR); Kia Corporation, Seoul (KR); Seoyon E-Hwa Co., Ltd., Anyang-si (KR)

(72) Inventors: Jungwook Lee, Bucheon-si (KR); Ji Wan Kim, Hwaseong-si (KR); Wenxu Huang, Yan Tai (CN); Xiaoqin Zheng, Yan Tai (CN); Hyun-Joon Park, Seoul (KR)

(73) Assignees: Hyundai Motor Company, Seoul (KR); Kia Corporation, Seoul (KR); Seoyon E-Hwa Co., Ltd., Anyang-si (KR)

( * ) Notice: Subject to any disclaimer, the term of this patent is extended or adjusted under 35 U.S.C. 154(b) by 528 days.

(21) Appl. No.: 17/375,272

(22) Filed: Jul. 14, 2021

(65) Prior Publication Data
US 2022/0048274 A1 Feb. 17, 2022

(30) Foreign Application Priority Data
Aug. 11, 2020 (KR) .................. 10-2020-0100581

(51) Int. Cl.
| B32B 5/24 | (2006.01) |
| B32B 5/02 | (2006.01) |
| B32B 5/16 | (2006.01) |
| B32B 5/30 | (2006.01) |
| D04H 1/22 | (2006.01) |
| G10K 11/168 | (2006.01) |

(52) U.S. Cl.
CPC ............... *B32B 5/24* (2013.01); *B32B 5/022* (2013.01); *B32B 5/16* (2013.01); *B32B 5/30* (2013.01); *D04H 1/22* (2013.01); *G10K 11/168* (2013.01); *B32B 2262/02* (2013.01); *B32B 2264/0257* (2013.01); *B32B 2307/102* (2013.01); *B32B 2307/72* (2013.01); *B32B 2605/00* (2013.01); *D10B 2505/12* (2013.01)

(58) Field of Classification Search
CPC .. B32B 5/24; B32B 5/022; B32B 5/16; B32B 2262/02; B32B 2264/0257; B32B 2307/102; B32B 2307/72; B32B 2605/00; D04H 1/22; G10K 11/168
See application file for complete search history.

(56) References Cited

U.S. PATENT DOCUMENTS

| 7,605,097 | B2 * | 10/2009 | Thompson | ........... D04H 1/4291 |
| | | | | 428/218 |
| 8,636,106 | B2 * | 1/2014 | Castagnetti | .......... G10K 11/168 |
| | | | | 181/290 |
| 10,062,371 | B2 * | 8/2018 | Wang | ....................... B32B 27/40 |
| 10,596,944 | B2 * | 3/2020 | Hattori | ................ B32B 38/0036 |

(Continued)

FOREIGN PATENT DOCUMENTS

WO WO-2019107019 A1 * 6/2019 ............. B32B 15/14

*Primary Examiner* — Forrest M Phillips
(74) *Attorney, Agent, or Firm* — Slater Matsil, LLP

(57) ABSTRACT

An embodiment dash isolation pad includes a 3D vertical nonwoven fabric layer having a structure in which wave-type short fibers are vertically arranged, a sound absorption layer on one side or both sides of the 3D vertical nonwoven fabric layer, and an olefin-based powder layer between the 3D vertical nonwoven fabric layer and the sound absorption layer.

20 Claims, 15 Drawing Sheets

(56) References Cited

U.S. PATENT DOCUMENTS

| | | | | |
|---|---|---|---|---|
| 10,792,870 | B2* | 10/2020 | Arvidson | D04H 1/435 |
| 2005/0255318 | A1* | 11/2005 | Czerny | C04B 20/0032 |
| | | | | 442/136 |
| 2006/0065482 | A1* | 3/2006 | Schmidft | E04B 1/625 |
| | | | | 181/290 |
| 2007/0119651 | A1* | 5/2007 | Mori | B32B 5/26 |
| | | | | 181/290 |
| 2018/0147793 | A1* | 5/2018 | Arvidson | B32B 5/24 |
| 2019/0156812 | A1* | 5/2019 | Bixel | B32B 21/10 |
| 2019/0351643 | A1* | 11/2019 | Broadaway | B32B 3/26 |

* cited by examiner

DASH ISOLATION PAD

CROSS-REFERENCE TO RELATED APPLICATIONS

This application claims the benefit of Korean Patent Application No. 10-2020-0100581, filed on Aug. 11, 2020, which application is hereby incorporated herein by reference.

TECHNICAL FIELD

The present disclosure relates to a dash isolation pad.

BACKGROUND

In general, as shown in FIG. 1, the dash isolation pad is manufactured by forming a heavy layer as a sound insulation material 10 by using a rubber material having a heavy specific gravity such as a thermoplastic elastomer (TPE) or ethylene vinyl acetate (EVA) and by attaching a sound absorption material 20 such as polyethylene terephthalate (PET) needle punching felt or fiber board felt to the heavy layer.

Conventionally, the weight of the sound insulation material was increased to improve the sound insulation performance of the dash isolation pad. However, when the sound insulation material is made of heavy weight, the sound insulation performance is excellent, but there is a problem that it causes deterioration in vehicle fuel efficiency and increases the cost.

Accordingly, a 3D vertical nonwoven fabric manufactured by arranging webs in a vertical direction has been proposed as a material that replaces the heavy weight sound insulation material. However, the thickness of the 3D vertical nonwoven fabric layer is restored again after compression molding, causing interference with adjacent parts, and due to the change in thickness, matching to the vehicle body decreases, results in BSR (buzz, squeak, and rattle) noise.

SUMMARY

The present disclosure relates to a dash isolation pad. Particular embodiments relate to a dash isolation pad that can reduce noise and has high numerical stability.

Therefore, an embodiment of the present disclosure provides a low weight dash isolation pad with high numerical stability and excellent NVH (noise, vibration and harshness) performance by eliminating the sound insulation material of heavy rubber material.

In accordance with one embodiment of the disclosure, a dash isolation pad includes a 3D vertical nonwoven fabric layer having a structure in which wave-type short fibers are vertically arranged, a sound absorption layer provided on one side or both sides of the 3D vertical nonwoven fabric layer, and an olefin-based powder layer provided between the 3D vertical nonwoven fabric layer and the sound absorption layer.

The area density of the 3D vertical nonwoven fabric layer may be 500 g/m$^2$ or more.

The 3D vertical nonwoven fabric layer may include 8 denier fibers in wave form of 50% to 70% by weight and 4 denier low melting fibers of 30% to 50% by weight.

The weight ratio of the 3D vertical nonwoven fabric layer to the dash isolation pad may be 0.29 to 0.71.

The sound absorption layer may be provided with a polyethylene terephthalate (PET) felt layer.

The sound absorption layer may be provided with a fiber board or needle punching nonwoven fabric.

The area density of the sound absorption layer may be 500 g/m$^2$ or more.

The area density of the sound absorption layer may be 100 g/m$^2$ or less.

The sound absorption layer may include 8 denier and 4 denier fibers of 50% or more.

The sound absorption layer may include a low melting fiber of 20% or more.

The sound absorption layer may be provided with at least one selected from the group consisting of polyethylene (PE), polypropylene (PP), and polycarbonate (PC) and combinations thereof.

The olefin-based powder layer may be provided with a polyethylene (PE) powder layer.

The sound absorption layer may include an upper sound absorption layer provided on the upper side of the 3D vertical nonwoven fabric layer, and a lower sound absorption layer provided on the lower side of the 3D vertical nonwoven fabric layer.

The dash isolation pad may further include an upper olefin-based powder layer provided between the 3D vertical nonwoven fabric layer and the upper sound absorption layer.

The dash isolation pad may further include a lower olefin-based powder layer provided between the 3D vertical nonwoven fabric layer and the lower sound absorption layer.

The weight ratio of the upper olefin-based powder layer may be 0.8 to 0.9 based on the total weight of the upper olefin-based powder layer and the lower olefin-based powder layer.

BRIEF DESCRIPTION OF THE DRAWINGS

These and/or other features of the disclosure will become apparent and more readily appreciated from the following description of the embodiments, taken in conjunction with the accompanying drawings, in which.

DETAILED DESCRIPTION OF ILLUSTRATIVE EMBODIMENTS

This specification does not describe all elements of the embodiments, and general content in the technical field to which the present disclosure belongs or content overlapping between the embodiments will be omitted.

In addition, when a part "includes" a certain component, it means that other components may be further included rather than excluding other components unless specifically stated to the contrary.

Expressions in the singular number include expressions in the plural unless the context clearly has exceptions.

Hereinafter, embodiments of the present disclosure will be described in detail.

Figure 1:
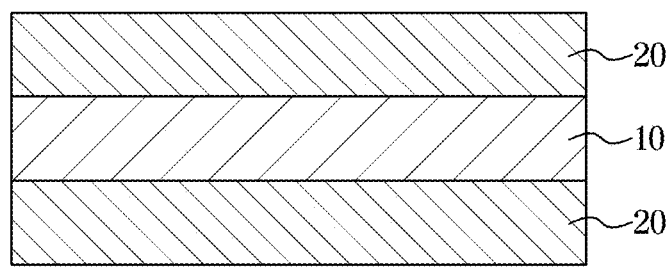
FIG. 1 shows a cross-sectional view of a dash isolation pad provided with a sound insulation material as a heavy layer according to the prior art.
Figure 2:
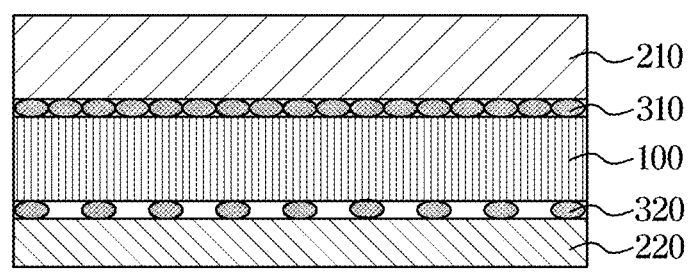
FIG. 2 is a cross-sectional view illustrating a dash isolation pad according to an embodiment of the present disclosure.

In the dash isolation pad according to an embodiment of the present disclosure, as shown in FIG. 2, sound absorption layers 210 and 220 are provided on one side or both sides of a 3D vertical nonwoven fabric layer 100, and the 3D vertical nonwoven fabric layer 100 and the sound absorption layers 210 and 220 are formed by bonding to each other by olefin-based powder layers 310 and 320.

The 3D vertical nonwoven fabric layer 100 includes wave-type short fibers arranged in a vertical direction.

The wave-type short fiber has a small rebound elasticity of the fiber compared to the general short fiber and is flexible, so the phenomenon that the dash isolation pad returns to its original thickness after preheating and press molding of the nonwoven fabric can be suppressed.

The 3D vertical nonwoven fabric layer 100 may include a fineness 8 denier wave-type short fiber in the range of 50% to 70%. If it is less than 50%, it is not preferable because the elasticity of the vertical structure is lowered and molding failure may occur, and if it is more than 70%, it is not preferable because the content of the adhesive fiber is reduced and it is not well compressed to the molding thickness.

In addition, the 3D vertical nonwoven fabric layer 100 may include low melting fiber (LM) of 30% to 50%.

For example, it may be prepared by using fineness 8 denier wave-type short fiber 55% and fineness 4 denier low melting short fiber 45%.

The 3D vertical nonwoven fabric layer 100 may have a thickness of 10 mm or less before molding.

The 3D vertical nonwoven fabric layer 100 may have an area density of 500 g/m² or more, and preferably 600 g/m² to 1500 g/m². If the area density is less than 600 g/m², it is not preferable because there is a limit to vertically arranging the wave-type short fibers, and the thickness of the nonwoven fabric may become thin. If it exceeds 1500 g/m², it is not preferable because molding defects may occur due to an excessive number of fibers per unit volume when used.

The 3D vertical nonwoven fabric layer wo may have a weight ratio of 0.29 to 0.71 based on the total weight of the 3D vertical nonwoven fabric layer 100. It showed the best sound absorption performance in the frequency range of 2000 Hz or higher within this weight ratio range.

The sound absorption layers 210 and 220 enhance the formability of the dash isolation pad itself, and have high viscous resistance against noise due to high air flow resistance, thereby improving sound absorption performance.

The sound absorption layers 210 and 220 may be made of felt made of polyethylene terephthalate (PET). The felt is manufactured by horizontally stacking nonwoven fabrics of about 10 g/m² called a web. The felt made of polyethylene terephthalate (PET) can maximize sound absorption and sound insulation performance by controlling air flow resistance.

The sound absorption layers 210 and 220 may include general short fibers, low melting short fibers, and recycled PET. The sound absorption layers 210 and 220 may include fineness 8 denier and 4 denier fibers of 50% or more and low melting short fibers (LM) of 20% or more.

Preferably, the sound absorption layers 210 and 220 may be prepared by using fineness 8 denier general short fiber of 50%, fineness 8 denier recycled PET of 30%, and fineness 4 denier low melting short fiber of 20%.

In addition, the sound absorption layers 210 and 220 may be manufactured to have a thickness of 10 mm or less before molding.

In addition, the area density of the sound absorption layers 210 and 220 may be 500 g/m² or more, and preferably 800 g/m² to 1500 g/m². If the area density is less than 800 g/m², it is not preferable because there may be difficulties in maintaining the shape of the part after hot press molding. If it exceeds 1500 g/m², it is not preferable because heat transfer to the inside of the felt is lowered during hot press molding, and molding defects may occur due to an excessive number of fibers per unit volume.

In addition, the sound absorption layers 210 and 220 are scrim layers and may be PET felts having an area density of 100 g/m² or less in consideration of weight and manufacturing cost.

In addition, the sound absorption layers 210 and 220 may be needle punching nonwoven fabric or fiber board. Needle punching nonwoven fabric is a nonwoven fabric in which felt is interlaced with a needle to impart rigidity, and fiber board nonwoven fabric is a nonwoven fabric with a relatively small number of needle punching and a thicker thickness compared to needle punching nonwoven fabric.

The sound absorption layer according to an embodiment of the present disclosure is limited to the above fiber composition, but is not limited thereto and may be manufactured using a conventional fiber composition.

The olefin-based powder layers 310 and 320 not only bonds the sound absorption layer 210 and 220 and the 3D vertical nonwoven fabric 100 to each other, but also has a fine ventilation hole formed between the powder particles, thereby enhancing sound absorption performance. The sound absorption performance can be controlled through ventilation hole control.

The olefin-based powder layers 310 and 320 may be polyethylene (PE) powder layers, and the weight per area of the PE powder may range from 100 to 300 g/m². If the weight per area of PE powder is less than 100 g/m², the adhesive strength is weak, and as the amount of PE powder increases, the adhesive strength is excellent, but if it exceeds 300 g/m², the air flow resistance is too high, so sound absorption performance decreases. It is not desirable.

When the sound absorption layer is provided on both sides of the 3D vertical nonwoven fabric layer 100, the sound absorption layer includes an upper sound absorption layer 210 provided on the upper side of the 3D vertical nonwoven fabric layer 100 and a lower sound absorption layer 220 provided on the lower side of the 3D vertical nonwoven fabric layer 100. For example, the upper sound absorption layer 210 may be provided with a PET felt layer having an area density of 500 g/m² or more, and the lower sound absorption layer 220 may be provided with a PET felt layer having an area density of 100 g/m² or less. The upper sound absorption layer 210 and the lower sound absorption layer 220 may be attached to the 3D vertical nonwoven fabric layer 100 by olefin-based powder. In this case, it may include an upper olefin-based powder layer 310 interposed between the 3D vertical nonwoven fabric layer 100 and the upper sound absorption layer 210 and a lower olefin-based powder layer 320 interposed between the 3D vertical nonwoven fabric layer 100 and the lower sound absorption layer 220. The weight ratio of the upper olefin-based powder layer 310 and the lower olefin-based powder layer 320 may range from 8:2 to 9:1. That is, based on the total weight of the upper olefin-based powder layer 310 and the lower olefin-based powder layer 320, the weight ratio of the upper olefin-based powder layer 310 may be 0.8 to 0.9.

Figure 3:
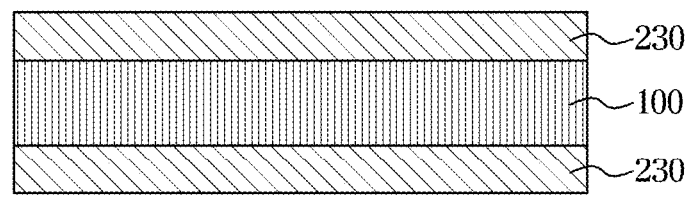
FIG. 3 is a cross-sectional view of a dash isolation pad in which PET felt layers are provided on both sides of a 3D vertical nonwoven fabric layer according to an embodiment of the present disclosure.

The dash isolation pad according to embodiments of the present disclosure may be formed by providing a PET felt layer 230 having an area density of 100 g/m² or less on one side or both sides of the 3D vertical nonwoven fabric layer 100 as shown in FIG. 3. The 3D vertical nonwoven fabric layer 100 according to embodiments of the present disclosure has better sound absorption performance than the existing 3D vertical nonwoven fabric made of general short fiber. Therefore, it is possible to control the NVH performance by omitting the PET felt layer as an existing hard layer and enhancing the sound absorption performance of only 3D vertical nonwoven fabric.

Figure 4:
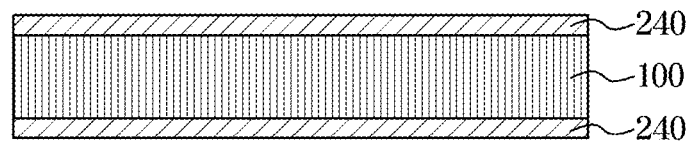
FIG. 4 is a cross-sectional view of a dash isolation pad in which film layers are provided on both sides of a 3D vertical nonwoven fabric layer according to an embodiment of the present disclosure.

In addition, as shown in FIG. 4, a film layer 240, a non-ventilated material, may be formed on one or both sides of the 3D vertical nonwoven fabric layer 100. In this case, the film layer 240 may form a sound insulation structure, and may be formed by vacuum and press. The film layer 240 may be formed of one or more of polyethylene (PE), polypropylene (PP), and polycarbonate (PC) and combinations thereof, but is not limited thereto.

In the following, a specific Inventive Example and Comparative Example of embodiments of the present disclosure are presented, and the effect of the Inventive Example is described through sound absorption performance evaluation.

Evaluation Test

In the spring back evaluation of Inventive Example and Comparative Example according to embodiments of the present disclosure, the thickness change was measured after pressing the raw material and heating it. The sound absorption performance was measured and compared according to the sound absorption rate measurement method ISO 354/JIS A 1409 and ISO 10534-2/ASTM E2611-09.

1. Spring Back Evaluation of 3D Vertical Nonwoven Fabric According to Wave-Type Short Fiber Application.

Spring back evaluation was performed on 3D vertical nonwoven fabric applied with wave-type short fiber according to the Inventive Example of embodiments of the present disclosure and 3D vertical nonwoven fabric applied with conventional general short fiber as a comparative example.

Inventive Example 1 and Comparative Example 1, which have the structures shown in Table 1 below, were molded to have final thicknesses of 1 mm, 6 mm, and 15 mm by pressing as shown in Table 2, and the thickness change was measured after heat resistance at 80° C. and 90° C., and the measured thickness change is shown in Table 1 below.

TABLE 1

| | Structure | Raw material thickness |
|---|---|---|
| Inventive Example 1 | 3D vertical nonwoven fabric applied with wave-type short fiber | 25 mm |
| Comparative Example 1 | 3D vertical nonwoven fabric applied with general short fiber | 25 mm |

TABLE 2

| Raw material thickness | Molding (pressing) thickness | | Thickness change after heat resistance (mm) | |
|---|---|---|---|---|
| | | | 80° C. (SPEC) | 90° C. |
| 25 mm | 1 mm | Comparative Example1 | 0.2 | 0.3 |
| | | Inventive Example 1 | 0.1 | 0.2 |
| | 6 mm | Comparative Example 1 | 2.6 | 3.6 |
| | | Inventive Example 1 | 1.0 | 2.4 |
| | 15 mm | Comparative Example 1 | 2.8 | 3.8 |
| | | Inventive Example 1 | 1.5 | 2.8 |

As shown in Table 2 above, the 3D vertical nonwoven fabric layer applied with the wave-type short fiber of Inventive Example 1 according to embodiments of the present disclosure has a thickness change of 0.1 to 1.5 mm after heat resistance at 80° C., whereas the thickness change of Comparative Example 1 was 0.2 to 2.8 mm. Inventive Example 1 showed that the spring back phenomenon was improved by 50% compared to Comparative Example 1.

2. Evaluation of Sound Absorption Performance of 3D Vertical Nonwoven Fabric According to Wave-Type Short Fiber Application.

As shown in Table 3 below, Inventive Example 1, a 3D vertical nonwoven fabric applied with wave-type short fiber according to the present disclosure, and Comparative Example 1, a low-density vertical nonwoven fabric applied with a conventional general short fiber, were prepared to evaluate sound absorption.

TABLE 3

| | Structure |
|---|---|
| Inventive Example 1 | 3D vertical nonwoven fabric applied with wave-type short fiber |
| Comparative Example 1 | 3D vertical nonwoven fabric applied with general short fiber |

Figure 5:
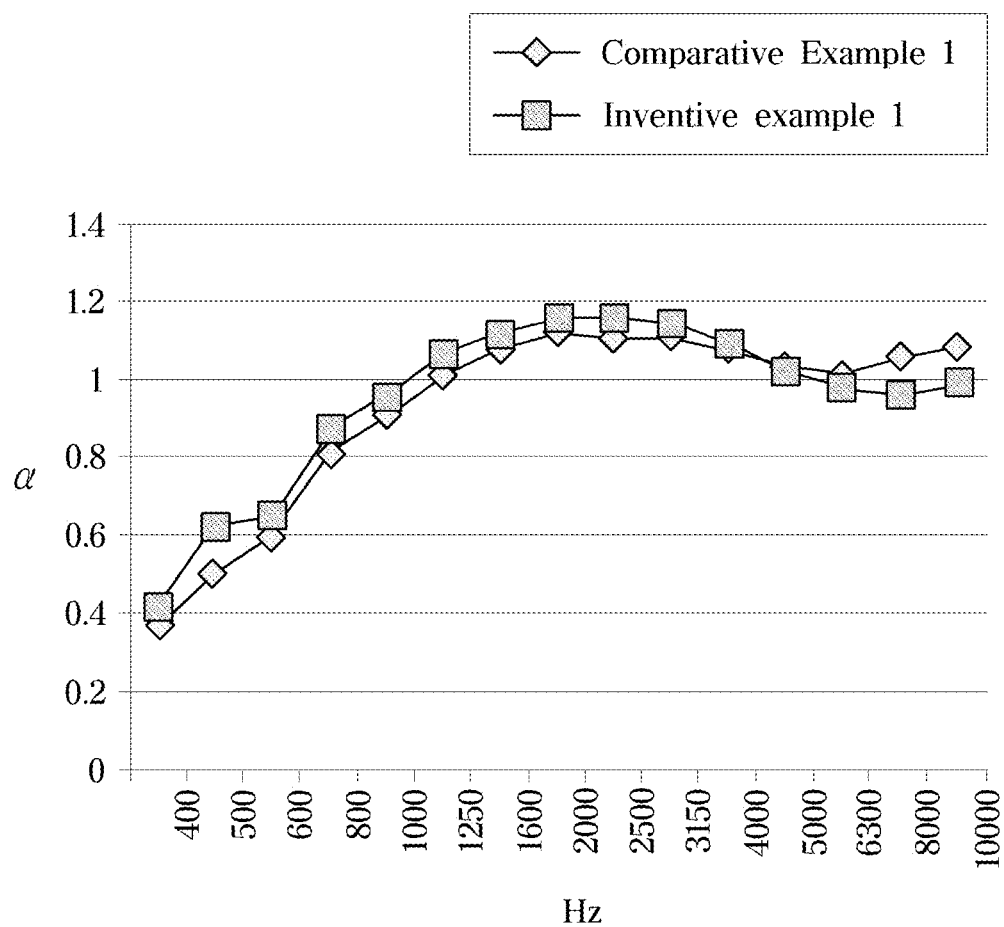
FIG. 5 shows the measurement of the sound absorption rate of the 3D vertical nonwoven fabric of Inventive Example 1 and Comparative Example 1.
Figure 6A:
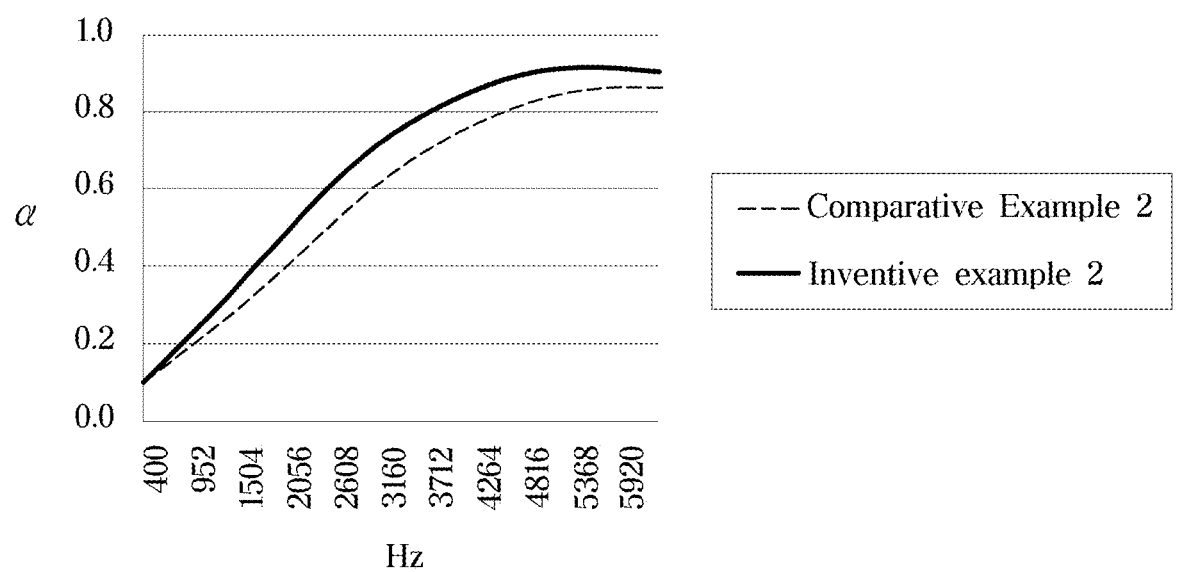
FIGS. 6A to 6D show the measurement of sound absorption rates of Inventive Examples 2 to 5 and Comparative Examples 2 to 5, respectively.
Figure 6B:
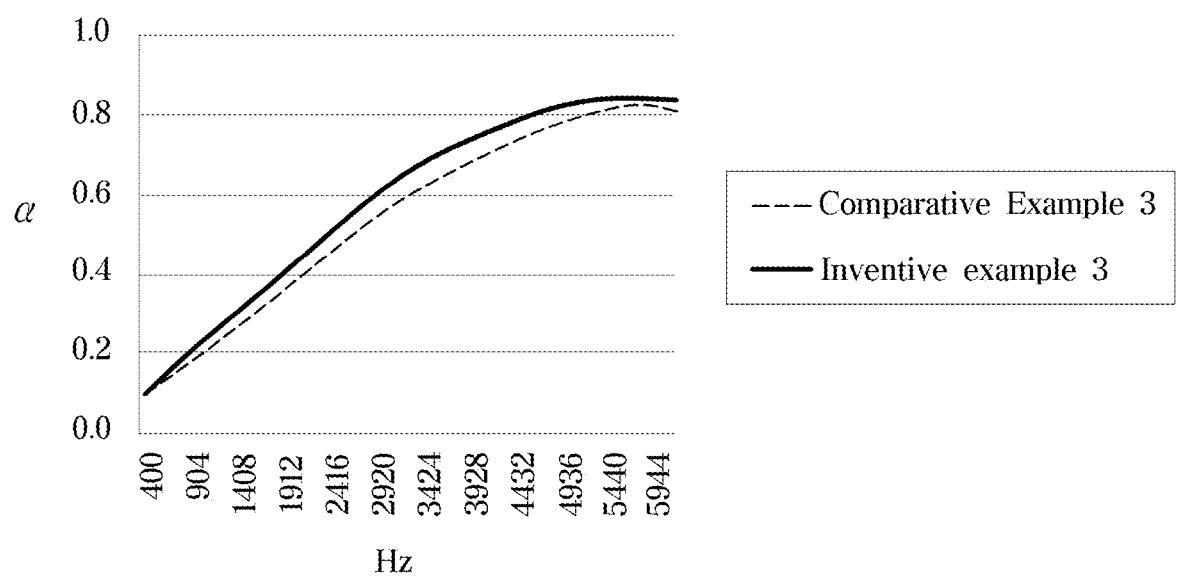
Figure 6C:
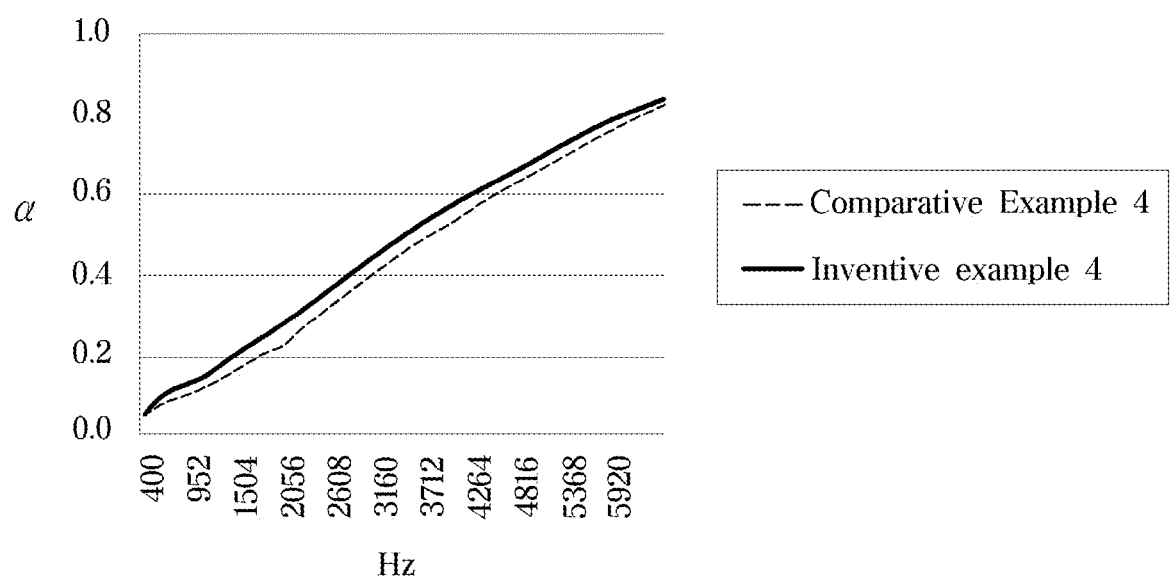
Figure 6D:
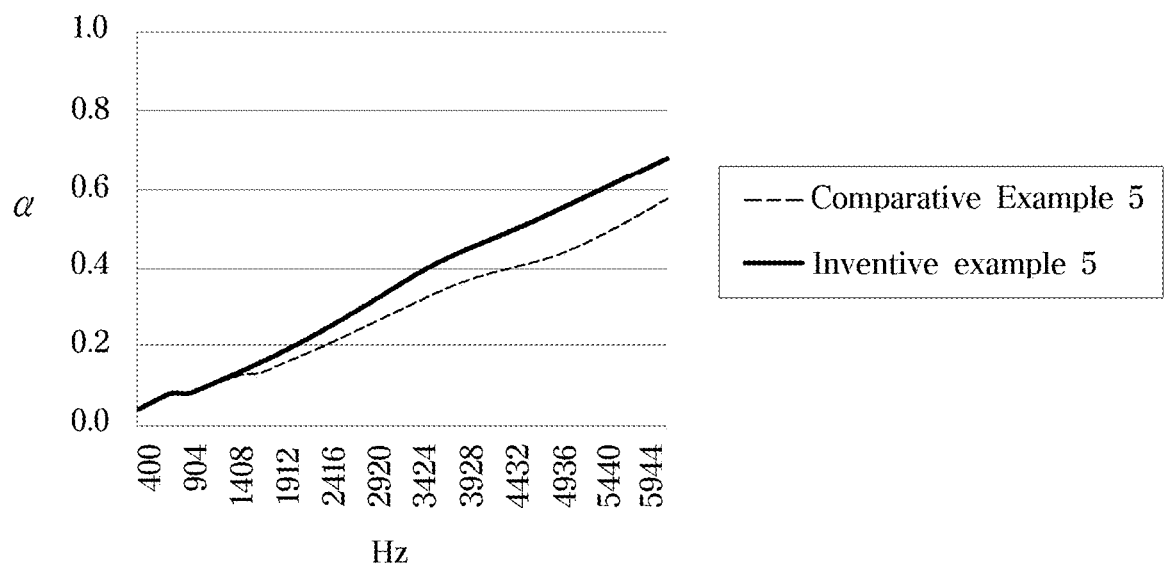

As shown in FIG. 5, Inventive Example 1 according to embodiments of the present disclosure improved the sound absorption performance by 5-10% compared to Comparative Example 1.

3. Evaluation of Sound Absorption Performance of 3D Vertical Nonwoven Fabric and Fiber Board (or N/P Nonwoven Fabric).

As shown in Table 4 below, Inventive Examples 2 to 5, which are 3D vertical nonwoven fabrics according to embodiments of the present disclosure, and Comparative Examples 2 to 5, which are fiber boards or needle punching nonwoven fabrics (N/P nonwoven fabrics) that are 10% higher in weight than the Inventive Examples, were prepared. Then, sound absorption was evaluated using an impedance tube. The material thickness of each Inventive Example and Comparative Example was unified.

TABLE 4

|  | Structure | Thickness |
|---|---|---|
| Inventive Example 2 | 900 g 3D vertical nonwoven fabric | 16 mm |
| Inventive Example 3 | 750 g 3D vertical nonwoven fabric | 16 mm |
| Inventive Example 4 | 900 g 3D vertical nonwoven fabric | 7 mm |
| Inventive Example 5 | 750 g 3D vertical nonwoven fabric | 6 mm |
| Comparative Example 2 | 1000 g fiber board | 16 mm |
| Comparative Example 3 | 800 g fiber board | 16 mm |
| Comparative Example 4 | 1000 g N/P nonwoven fabric | 7 mm |
| Comparative Example 5 | 800 g N/P nonwoven fabric | 6 mm |

As shown in FIGS. 6A to 6D, Inventive Examples 2 to 5 according to embodiments of the present disclosure have excellent sound absorption performance even though the weight is 10% lower than that of Comparative Examples 2 to 5 (general fiber board or nonwoven fabric).

4. Evaluation of Soft Layer Sound Absorption Performance According to the Application of 3D Vertical Nonwoven Fabric.

As shown in Table 5 below, Inventive Example 6 in which 3D vertical nonwoven fabric and needle punching nonwoven fabric (N/P nonwoven fabric) according to embodiments of the present disclosure are bonded by PE powder, and Comparative Example 6 in which conventional fiber board was bonded to needle punching nonwoven fabric (N/P nonwoven fabric) were prepared. And then, sound absorption evaluation was performed on the passenger side and the dash panel side. The thickness of the raw material was unified to 24 mm.

TABLE 5

|  | Structure | Thickness |
|---|---|---|
| Inventive Example 6 | 1100 g 3D vertical nonwoven fabric + 100 g PE powder + 600 g + needle punching nonwoven fabric (N/P nonwoven fabric) | 24 mm |
| Comparative Example 6 | 1000 g fiber board + 800 g needle punching nonwoven fabric (N/P nonwoven fabric) | 24 mm |

Figure 7A:
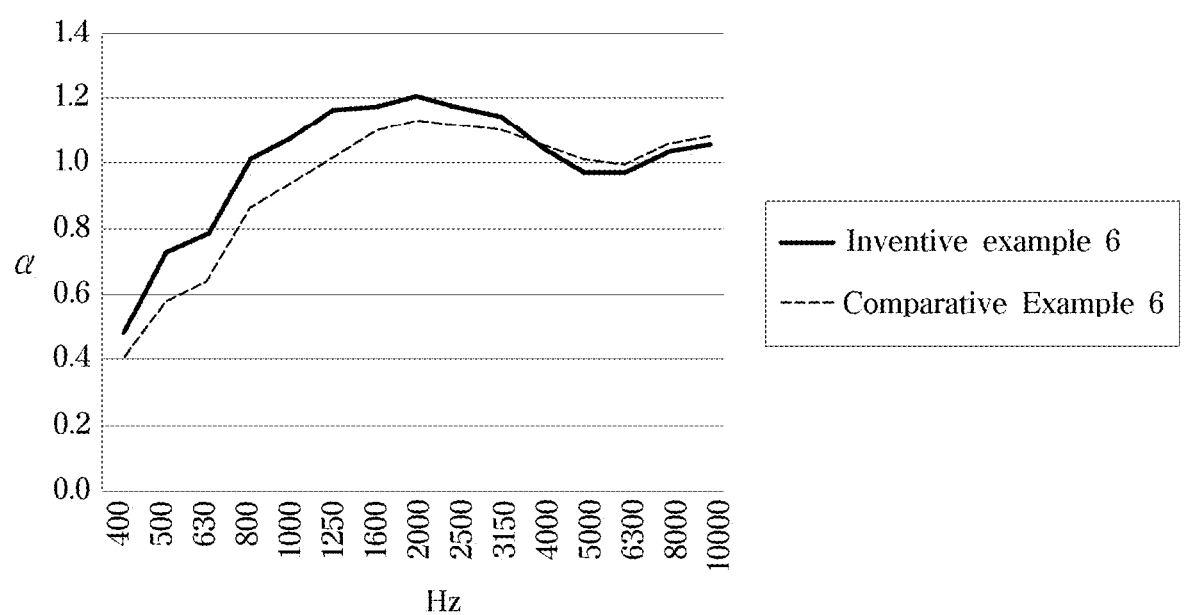
FIGS. 7A and 7B show the measurement of sound absorption rates of Inventive Example 6 and Comparative Example 6 at the passenger side and the dash panel side, respectively.
Figure 7B:
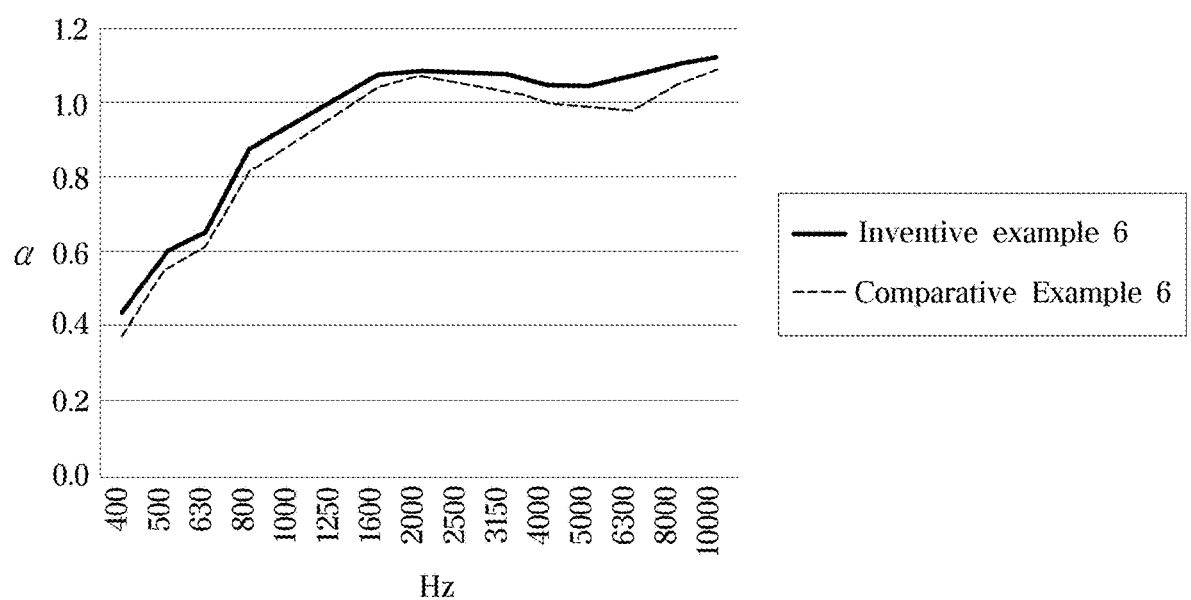

As shown in FIGS. 7A and 7B, Inventive Example 6 according to embodiments of the present disclosure has 5-15% better sound absorption performance than Comparative Example 6, and the passenger side showed higher sound absorption performance improvement than the dash panel side.

5. Evaluation of Sound Absorption Performance According to the Weight Ratio of PE Powder.

A dash isolation pad formed by sequentially stacking a 1000 g/m² PET felt layer, an upper PE powder layer, a 3D vertical nonwoven fabric, a lower PE powder layer and a 30 g/m² PET felt layer according to embodiments of the present disclosure was prepared. The weight of the upper PE powder layer and the lower PE powder layer was prepared as shown in Table 6 below, and the average sound absorption coefficient was measured.

TABLE 6

| Upper powder weight (g/m²) | Lower powder weight (g/m²) | Average sound absorption coefficient (400 Hz~6.4 kHz) |
|---|---|---|
| None | 20 | 0.63 |
| 100 |  | 0.65 |
| 150 |  | 0.66 |
| 200 |  | 0.66 |
| 250 |  | 0.66 |
| 300 |  | 0.62 |

Figure 8:
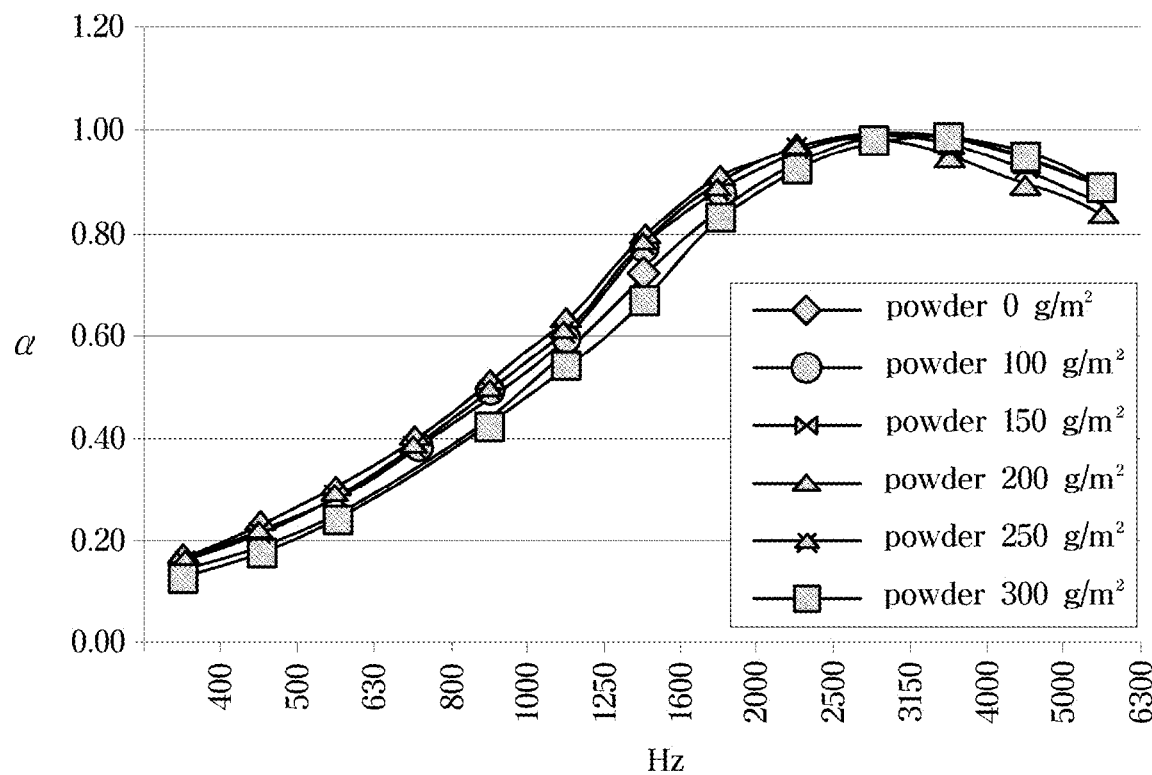
FIG. 8 shows the measurement of the sound absorption rate according to the amount of the upper PE powder when the weight of the lower PE powder is 20 g/m$^2$.

As shown in Table 6 and FIG. 8, in the case in which the weight of the lower powder is 20 g/m², when the weight of the upper powder layer is 100 to 250 g/m², that is, the weight ratio of the upper PE powder and the lower PE powder is 8:2 to 9:4 the sound absorption performance was the best. The higher the amount of the lower PE powder, the higher the airflow resistance, resulting in excellent adhesion, and the higher the sound absorption performance, but at 300 g/m² or more, the airflow resistance becomes too high and the sound absorption performance deteriorates.

6. Evaluation of Sound Absorption Performance According to the Weight Ratio of Sound Absorption Layer and 3D Vertical Nonwoven Fabric.

A dash isolation pad formed by sequentially stacking a high-density PET felt layer (hard layer), an upper PE powder layer, a 3D vertical nonwoven fabric (soft layer), a lower PE powder layer and a PET felt layer according to the present disclosure, and a comparative example formed by sequentially stacking the conventional hard layer, TPE sound insulation layer, and soft layer were prepared. The weights of the hard layer and the soft layer were prepared as shown in Table 7 below, and the average sound absorption coefficient was measured. At this time, the content of PE powder in Inventive Example was 100 g/m² and the scrim layer was 30 g/m².

TABLE 7

| Test piece | Hard layer weight (g/m²) | TPE sound insulation layer (g/m²) | Soft layer weight (g/m²) | Weight ratio (hard layer: soft layer) |
|---|---|---|---|---|
| Inventive Example 7 | 600 | None | 1100 | 3.5:6.5 |
| Inventive Example 8 | 800 | None | 900 | 4.7:5.3 |
| Inventive Example 9 | 1000 | None | 700 | 5.9:4.1 |
| Inventive Example 10 | 1100 | None | 600 | 6.5:3.5 |
| Inventive Example 11 | 1200 | None | 500 | 7.1:2.9 |
| Comparative Example | 800 | 1000 | 900 | — |

Figure 9:
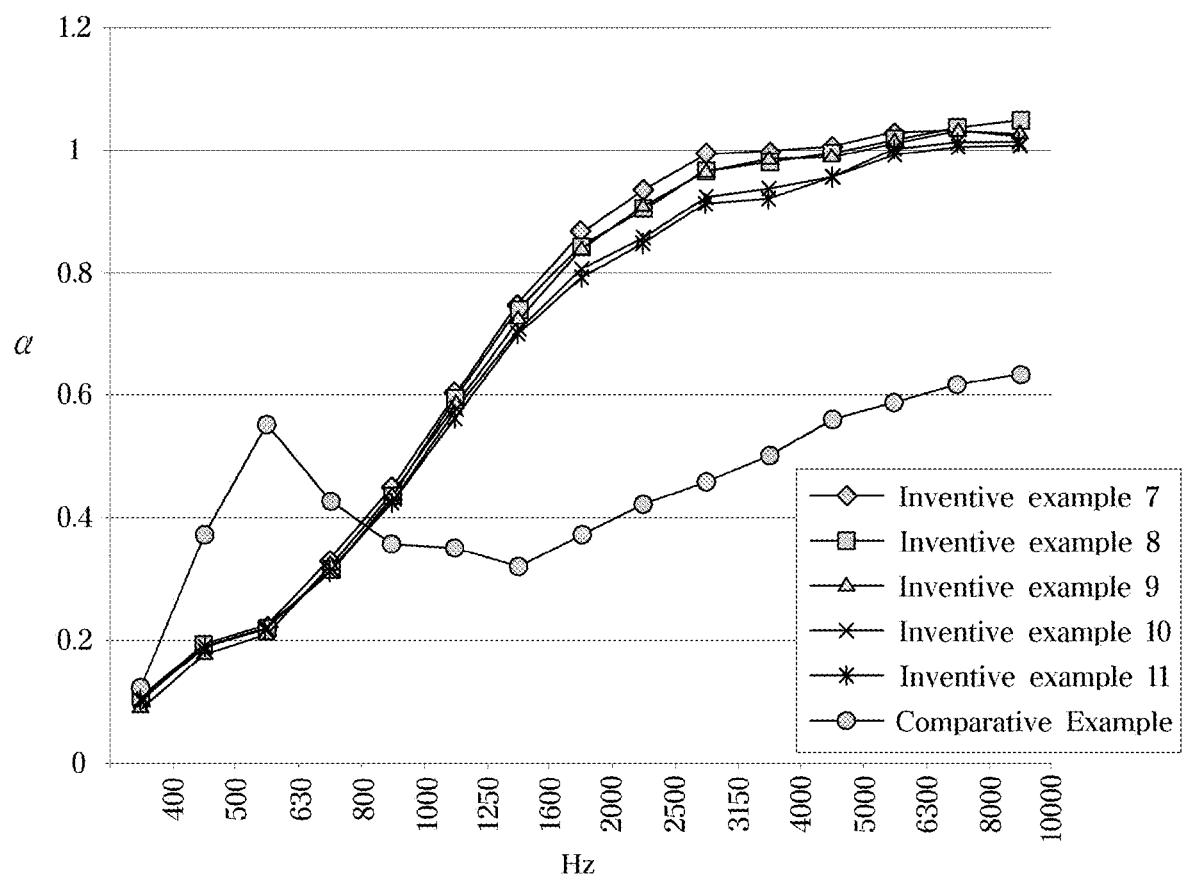
FIG. 9 shows the measurement of sound absorption rates of Inventive Examples 7 to 11 and Comparative Example.

Comparing the sound absorption performance of Inventive Examples 7 to 11 and Comparative Example, as shown in FIG. 9, the Inventive Example has significantly higher sound absorption performance than the Comparative Example. In addition, it was found that the sound absorption performance was relatively excellent in Inventive Example 7 to Inventive Example 10, where the weight ratio (hard layer:soft layer) was 71% or less: 29% or more in the region of 2000 Hz or higher.

7. Real Vehicle NVH Evaluation.

Inventive Example 12 formed by sequentially stacking a high-density PET felt layer, an upper PE powder layer, a 3D vertical nonwoven fabric, a lower PE powder layer and a scrim layer according to embodiments of the present disclosure, and a comparative example formed by sequentially stacking a conventional hard layer, a TPE sound insulation layer, and a soft layer were prepared and manufactured as shown in Table 8 below, and the real vehicle NVH was evaluated.

Articulation Index (AI): As a measure of conversation clarity, the higher the better (100=100% understanding of the other party's conversation, 0=0% understanding of the other party's conversation).

Loudness: The noise level subjectively felt by a person other than the physical value (Pa dB)

TABLE 8

| Test piece | Hard layer weight (g/m$^2$) | TPE sound insulation layer (g/m$^2$) | Soft layer weight (g/m$^2$) | Weight ratio (hard layer: soft layer) |
|---|---|---|---|---|
| Inventive Example 12 | 1000 | None | 700 | 5.9:4.1 |
| Comparative Example | 800 | 1000 | 900 | — |

TABLE 9

| Driver RH | Comparative Example | Inventive Example 12 |
|---|---|---|
| AI | 73.4 | 75.3 |
| Loudness | 22.3 | 20.9 |

Figure 10A:
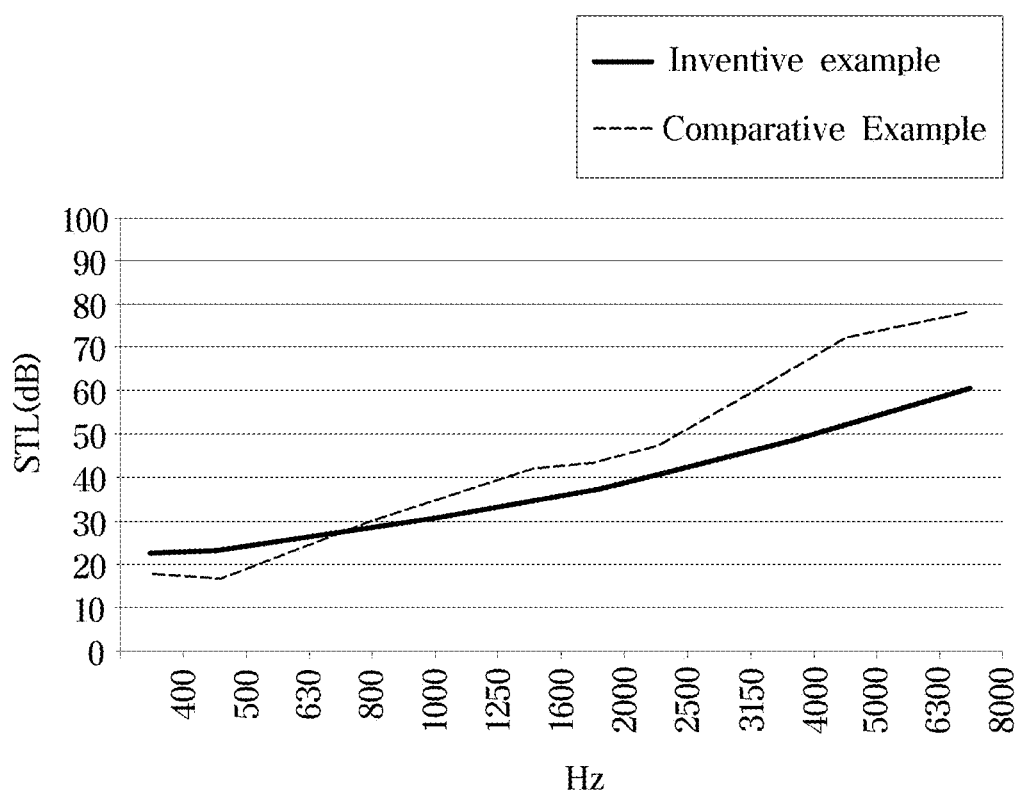
FIGS. 10A and 10B show comparisons of sound insulation performance and sound absorption performance for Inventive Example 12 and Comparative Example, respectively.
Figure 10B:
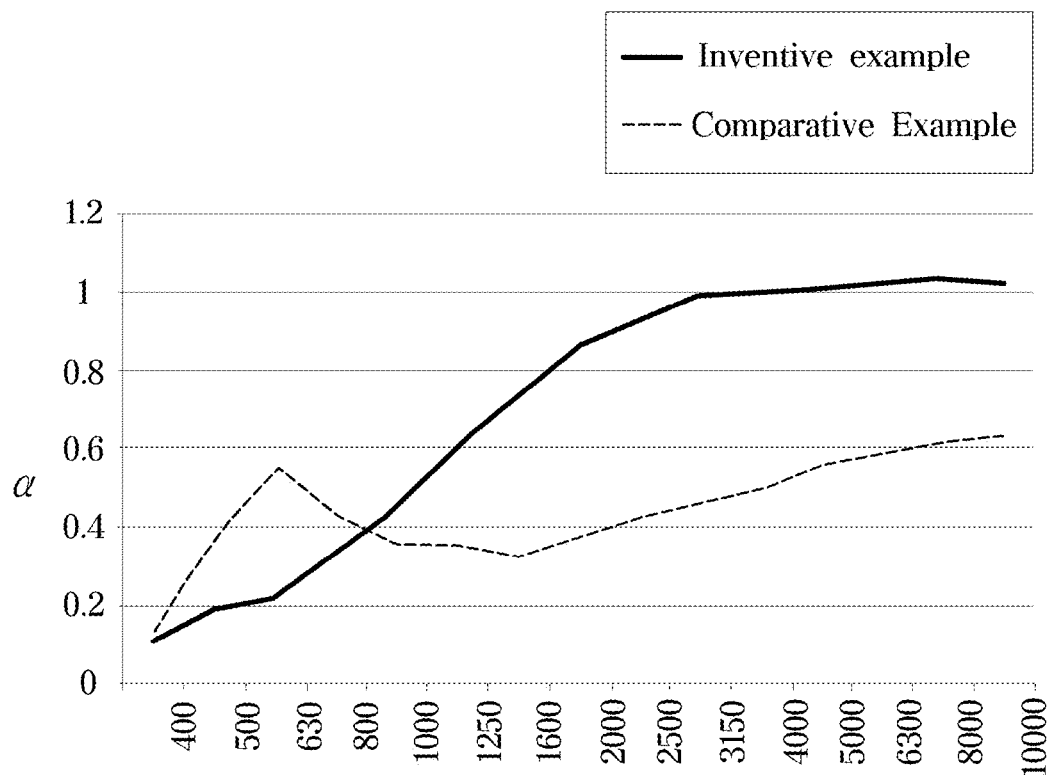

As shown in Table 9 above, it can be seen that Inventive Example 12 has superior AI (Articulation Index) and Loudness compared to Comparative Example when evaluating real vehicle NVH. As shown in FIGS. 10A and 10B, the sound insulation performance of Inventive Example 12 decreased slightly by weight compared to the Comparative Example, but the sound absorption performance increased significantly. And in general, the real vehicle NVH evaluation showed that the Inventive Example was superior to the Comparative Example. In Inventive Example 12, even though the TPE sound insulation layer (heavy layer) has been deleted, the real vehicle NVH performance is superior to that of the conventional dash isolation pad, so it is possible to realize weight reduction of 30% or more compared to the conventional dash isolation pad.

As described above, the disclosed embodiments have been described with reference to the accompanying drawings. Those of ordinary skill in the technical field to which the present disclosure belongs will understand that the present disclosure may be implemented in a form different from the disclosed embodiments without changing the technical idea or essential characteristics of the present disclosure. The disclosed embodiments are exemplary and should not be construed as limiting.

The dash isolation pad according to an embodiment of the present disclosure can realize lighter weight compared to the existing dash isolation pad and reduce cost by removing a heavy sound insulation material (heavy layer).

The dash isolation pad according to an embodiment of the present disclosure can improve the real vehicle NVH performance compared to the existing dash isolation pad by greatly increasing the sound absorption performance even though the heavy sound insulation material (heavy layer) is deleted.

The dash isolation pad according to an embodiment of the present disclosure can secure numerical stability due to a small thickness change after compression molding compared to a dash isolation pad using an existing 3D vertical nonwoven fabric.

What is claimed is:

1. A dash isolation pad comprising:
a 3D vertical nonwoven fabric layer having a structure in which wave-type short fibers are vertically arranged;
an upper sound absorption layer on an upper side of the 3D vertical nonwoven fabric layer;
a lower sound absorption layer on a lower side of the 3D vertical nonwoven fabric layer;
an upper olefin-based powder layer between the 3D vertical nonwoven fabric layer and the upper sound absorption layer; and
a lower olefin-based powder layer between the 3D vertical nonwoven fabric layer and the lower sound absorption layer, wherein a weight ratio of the upper olefin-based powder layer is 0.8 to 0.9 based on a total weight of the upper olefin-based powder layer and the lower olefin-based powder layer.

2. The dash isolation pad according to claim 1, wherein an area density of the 3D vertical nonwoven fabric layer is 500 g/m$^2$ or more.

3. The dash isolation pad according to claim 1, wherein the 3D vertical nonwoven fabric layer comprises 8 denier fibers in wave form of 50% to 70% by weight and 4 denier low melting fiber of 30% to 50% by weight.

4. The dash isolation pad according to claim 1, wherein a weight ratio of the 3D vertical nonwoven fabric layer to the dash isolation pad is 0.29 to 0.71.

5. The dash isolation pad according to claim 1, wherein the upper sound absorption layer and the lower sound absorption layer comprise a polyethylene terephthalate felt layer.

6. The dash isolation pad according to claim 1, wherein the upper sound absorption layer and the lower sound absorption layer comprise a fiber board or needle punching nonwoven fabric.

7. The dash isolation pad according to claim 1, wherein an area density of the upper sound absorption layer and the lower sound absorption layer is 500 g/m$^2$ or more.

8. The dash isolation pad according to claim 1, wherein an area density of the upper sound absorption layer and the lower sound absorption layer is 100 g/m$^2$ or less.

9. The dash isolation pad according to claim 1, wherein the upper sound absorption layer and the lower sound absorption layer comprise 8 denier fibers and 4 denier fibers of 50% or more.

10. The dash isolation pad according to claim 1, wherein the upper sound absorption layer and the lower sound absorption layer comprise a low melting fiber of 20% or more.

11. The dash isolation pad according to claim 1, wherein the upper sound absorption layer and the lower sound absorption layer comprise at least one of polyethylene (PE), polypropylene (PP), polycarbonate (PC) or combinations thereof.

12. The dash isolation pad according to claim 1, wherein the upper olefin-based powder layer and the lower powder olefin-based layer comprise a polyethylene (PE) powder layer.

13. The dash isolation pad according to claim 1, wherein the upper sound absorption layer comprises a polyethylene terephthalate felt layer having an area density of 500 g/m$^2$ or more.

14. The dash isolation pad according to claim 1, wherein the lower sound absorption layer comprises a polyethylene terephthalate felt layer having an area density of 100 g/m² or less.

15. A dash isolation pad comprising:
a 3D vertical nonwoven fabric layer having a structure in which wave-type short fibers are vertically arranged;
an upper sound absorption layer on an upper side of the 3D vertical nonwoven fabric layer, the upper sound absorption layer comprising a fiber board or needle punching nonwoven fabric, wherein an area density of the upper sound absorption layer is 100 g/m² or less and wherein the upper sound absorption layer comprises a low melting fiber of 20% or more;
a lower sound absorption layer on a lower side of the 3D vertical nonwoven fabric layer, the lower sound absorption layer comprising a fiber board or needle punching nonwoven fabric, wherein an area density of the lower sound absorption layer is 100 g/m² or less and wherein the lower sound absorption layer comprises a low melting fiber of 20% or more;
an upper olefin-based powder layer between the 3D vertical nonwoven fabric layer and the upper sound absorption layer, the upper olefin-based powder layer comprising a polyethylene (PE) powder layer; and
a lower olefin-based powder layer between the 3D vertical nonwoven fabric layer and the lower sound absorption layer, the upper olefin-based powder layer comprising a PE powder layer, wherein a weight ratio of the upper olefin-based powder layer is 0.8 to 0.9 based on a total weight of the upper olefin-based powder layer and the lower olefin-based powder layer.

16. The dash isolation pad according to claim 15, wherein the 3D vertical nonwoven fabric layer comprises 8 denier fibers in wave form of 50% to 70% by weight and 4 denier low melting fiber of 30% to 50% by weight.

17. The dash isolation pad according to claim 15, wherein a weight ratio of the 3D vertical nonwoven fabric layer to the dash isolation pad is 0.29 to 0.71.

18. The dash isolation pad according to claim 15, wherein the upper sound absorption layer and the lower sound absorption layer comprise 8 denier fibers and 4 denier fibers of 50% or more.

19. The dash isolation pad according to claim 15, wherein the upper sound absorption layer and the lower sound absorption layer comprise at least one of polyethylene (PE), polypropylene (PP), polycarbonate (PC) or combinations thereof.

20. A dash isolation pad comprising:
a 3D vertical nonwoven fabric layer having a structure in which wave-type short fibers are vertically arranged, wherein an area density of the 3D vertical nonwoven fabric layer is 500 g/m² or more;
an upper sound absorption layer on an upper side of the 3D vertical nonwoven fabric layer, wherein the upper sound absorption layer comprises a polyethylene terephthalate felt layer having an area density of 500 g/m² or more;
a lower sound absorption layer on a lower side of the 3D vertical nonwoven fabric layer, wherein the lower sound absorption layer comprises a polyethylene terephthalate felt layer having an area density of 100 g/m² or less;
an upper olefin-based powder layer between the 3D vertical nonwoven fabric layer and the upper sound absorption layer; and
a lower olefin-based powder layer between the 3D vertical nonwoven fabric layer and the lower sound absorption layer, wherein a weight ratio of the upper olefin-based powder layer is 0.8 to 0.9 based on a total weight of the upper olefin-based powder layer and the lower olefin-based powder layer.

* * * * *